United States Patent [19]
Warnock

[11] Patent Number: 6,125,200
[45] Date of Patent: Sep. 26, 2000

[54] REMOVING NON-TEXT INFORMATION FROM A COLOR IMAGE

[75] Inventor: John E. Warnock, Los Altos, Calif.

[73] Assignee: Adobe Systems Incorporated, San Jose, Calif.

[21] Appl. No.: 08/991,584

[22] Filed: Dec. 16, 1997

[51] Int. Cl.[7] ...................................................... H04N 1/32
[52] U.S. Cl. ............................................................. 382/164
[58] Field of Search .................................... 382/164, 176, 382/165; 358/462, 455

[56] References Cited

U.S. PATENT DOCUMENTS

| | | | |
|---|---|---|---|
| 5,311,336 | 5/1994 | Kurita et al. ............................... | 358/80 |
| 5,341,226 | 8/1994 | Shiau ....................................... | 358/518 |
| 5,748,343 | 5/1998 | Ikeda ........................................ | 358/501 |
| 5,768,403 | 6/1998 | Suzuki et al. ............................. | 382/165 |
| 5,883,973 | 3/1999 | Pascovici et al. ....................... | 382/176 |
| 5,909,505 | 6/1999 | Katayama et al. ....................... | 382/164 |

OTHER PUBLICATIONS

Adobe Systems Corp., PostScript® Language Reference Manual Second Edition, Addison–Wesley Publishing Company, pp. 303–307 (1996).

Foley et al., Computer Graphics, Principles and Practice, Second Edition In C, Addison–Wesley Publishing Company, pp. 584–595 (1996).

Y. Zhong, K. Karu, A.K. Jain, Locating Text in Complex Color Images; Pattern Recognition, vol. 28 No. 10, Great Britain (1995) pp. 1523–1535, 1995.

V. Wu, R. Manmatha, EM. Riseman; Finding Text in Images; University of Massachusetts, Amherst, MA pp. 1–32. (Jan. 1997).

*Primary Examiner*—Leo H. Boudreau
*Assistant Examiner*—Paul H. Schirduan
*Attorney, Agent, or Firm*—Fish & Richardson P.C.

[57] ABSTRACT

Method and apparatus for filtering non-text information from a page containing text, the text being associated with a color. The page is represented as an image in a first color space. The image is converted to a second color space that has a color channel closely associated with the text color. The color channel is selected and gray values are derived that correspond to text color channel values associated with cells in the image. Cells in the image having gray values of a predefined relationship with respect to predetermined threshold values are marked as text cells, and the remaining cells are identified as non-text cells. The gray values of the text and non-text cells are adjusted to increase the contrast between text and non-text information. The single-color space image may then be printed by a monochrome printer.

31 Claims, 5 Drawing Sheets

TABLE 1:

| 100 | 175 |
|-----|-----|
| 225 | 225 |

TABLE 2:

| 100 | 100 | 100 | 100 | 175 | 175 | 175 | 175 |
|-----|-----|-----|-----|-----|-----|-----|-----|
| 100 | 100 | 100 | 100 | 175 | 175 | 175 | 175 |
| 100 | 100 | 100 | 100 | 175 | 175 | 175 | 175 |
| 100 | 100 | 100 | 100 | 175 | 175 | 175 | 175 |
| 225 | 225 | 225 | 225 | 225 | 225 | 225 | 225 |
| 225 | 225 | 225 | 225 | 225 | 225 | 225 | 225 |
| 225 | 225 | 225 | 225 | 225 | 225 | 225 | 225 |
| 225 | 225 | 225 | 225 | 225 | 225 | 225 | 225 |

*FIG. 4A*

TABLE 3:

| 50 | 70 | 70 | 60 | 100 | 125 | 120 | 115 |
|----|----|----|----|-----|-----|-----|-----|
| 70 | 75 | 75 | 60 | 90  | 100 | 105 | 100 |
| 75 | 70 | 55 | 65 | 95  | 105 | 115 | 120 |
| 55 | 75 | 70 | 80 | 100 | 105 | 110 | 120 |
| 70 | 55 | 70 | 50 | 115 | 100 | 95  | 90  |
| 75 | 70 | 75 | 70 | 100 | 90  | 100 | 95  |
| 55 | 55 | 55 | 75 | 120 | 95  | 115 | 100 |
| 70 | 70 | 70 | 55 | 120 | 100 | 100 | 115 |

TABLE 4:

| 67 | 108 |
|----|-----|
| 65 | 103 |

FIG. 4B

REMOVING NON-TEXT INFORMATION FROM A COLOR IMAGE

BACKGROUND

The invention relates to removing non-text information from a color image.

It is not uncommon for extraneous marks to appear on a page containing text information. Such marks include stains (e.g., stains resulting from spills or aging of the paper), background marks (e.g., a color background or faint background image), and marks made by a user (e.g., those made by highlighting pens).

These extraneous marks may interfere with clear reproductions of the page because of difficulty in distinguishing text and non-text data. For example, if a contrast-based black and white copier is used to reproduce the page of text, the extraneous marks on the page may not have a sufficient contrast to the text, which may result in a blending of the marks with the text from the copying. The same difficulty may also be experienced when a color or black and white scanning device is used to convert the page for storage and processing in a computer system which is to be later printed on a black and white printer.

SUMMARY

In general, in one aspect, the invention features an apparatus for filtering non-text information from a page containing text. The apparatus includes a storage device for storing an image representing information on the page, the image being represented in a color space having multiple color channels, the text being associated with a color channel. A processor is configured to remove non-text color channels and to retain the text color channel.

Implementations of the invention may include one or more of the following features. The image is originally defined in a first color space, such as the RGB color space, and the processor is further configured to convert the image to a second color space, such as the CMYK space, having a primary color close to the text color, for example, black. The processor selects a channel of the second color space that is closely associated with the text color. The selected text color channel contains values associated with cells of the image. The processor derives gray values in a grayscale space based on corresponding values in the text color channel. Text and non-text cells are determined based on contrasts of gray values. The gray values of the text and non-text cells are adjusted to increase the contrast between text and non-text cells within the selected color channel.

In general, in another aspect, the invention features a computer-implemented method of filtering non-text information from an image containing text, the text being associated with a color. The method includes identifying a color channel closely associated with the text color. Gray values corresponding to text color channel values associated with cells in the image are derived. The text and non-text cells are determined based on their gray values.

In general, in another aspect, the invention features a program implemented in a computer for filtering non-text information from an image containing text, the text being associated with a color. The program includes instructions for causing the computer to convert the image to a color space having a color channel that is closely associated with the text color. Gray values based on text color channel values associated with components of the image are generated. Text and non-text components are determined based on gray values of the components.

In general, in another aspect, the invention features a program implemented in a computer for filtering non-text information from an image containing text. The program includes instructions for causing the computer to convert the image to the CMYK color space. Gray values in the K color channel representing cells of the image are used as gray values. The text and non-text components are determined based on the gray values of the cells in the image.

One of the advantages of the invention is better reproduction (photocopies or printouts) of a document's text information by removing extraneous marks (non-text information) from the page.

Other features and advantages will become apparent from the following description and from the claims.

DETAILED DESCRIPTION

Figure 1:
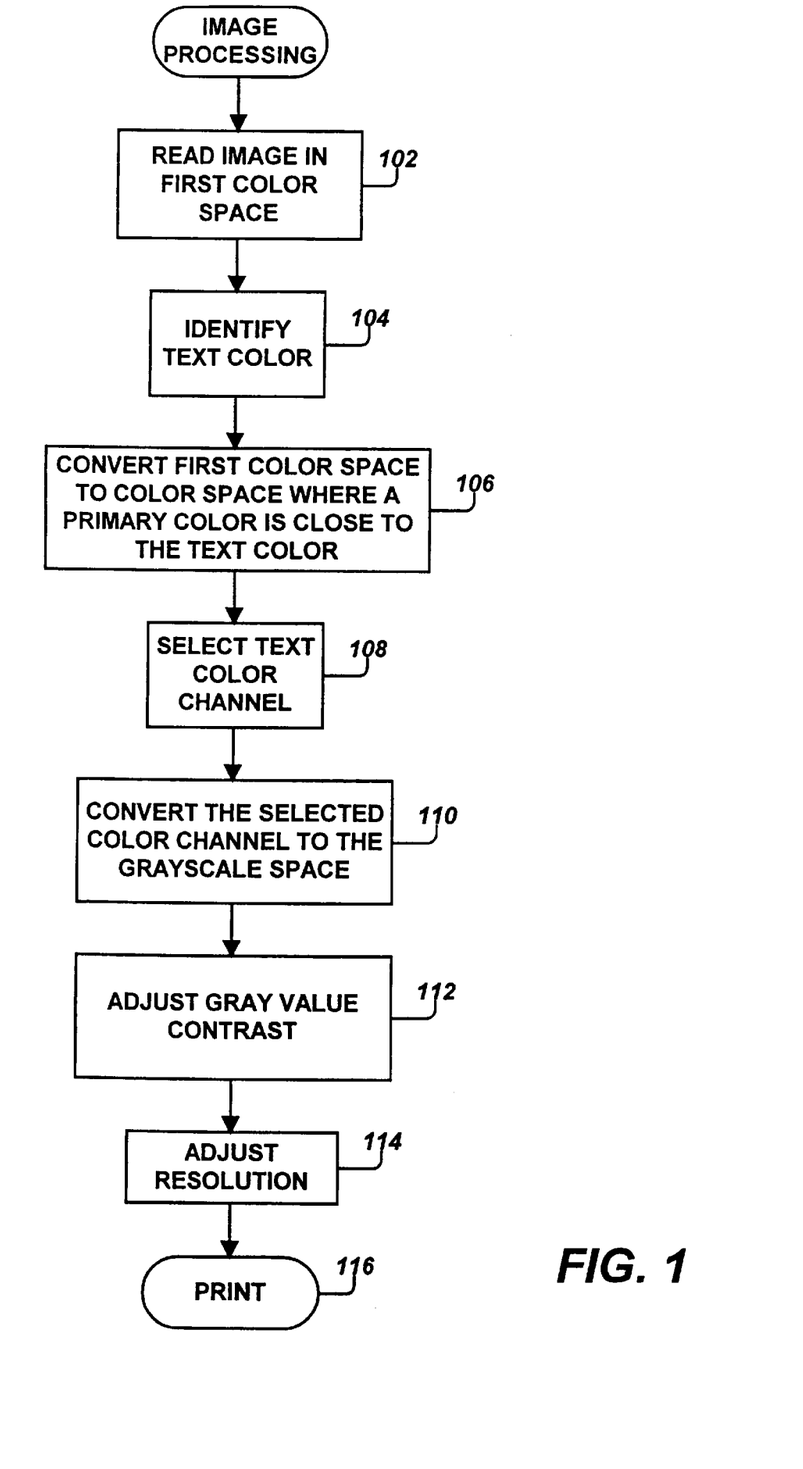
FIG. 1 is a flow diagram of an image processing program according to the present invention.

Referring to FIG. 1, to reduce extraneous marks in a document, an image processing program filters non-text components from a digitally captured color image (which can be generated using a scanning device, for example) representing a page containing text and non-text information. An image can be represented in a color space, which includes the RGB (red, green, blue) model, CMYK (cyan, magenta, yellow, black) model, the YIQ (luminance, chromacity) model, the HSV (hue, saturation, value) model, the HLS (hue, lightness, saturation) model, and the grayscale model. Most conventional scanning devices capture in the RGB space. Algorithms exist for converting between the several color spaces, with some described in James D. Foley et al., *Computer Graphics: Principals and Practice*, pp. 584–595 (2d ed., 1996); and Adobe Systems, Inc., *Postscript Language Reference Manual*, pp. 303–307 (2d ed., 1996), which are both hereby incorporated by reference.

The image processing program first reads the image, which can be, for example, in the RGB color space (step 102). Each pixel in the image is associated with a value (typically represented as multiple bits of data) for each of the color channels in the color space. Next, the image processing program identifies the color of the text (step 104). The most typical situation is an image having black text on a non-black background, such as white. However, with the proliferation of color printers, it is increasingly likely that text or the background can be colored.

One method of identifying the color of the text is by using the foreground/background pixel identification method described in U.S. patent application Ser. No. 08/865,021, entitled "Recognizing Text in a Multicolor Image," filed May 29, 1997, assigned to the same assignee as the present application, and hereby incorporated by reference, or by user input and designation.

Once the text color is identified, the image processing program converts the first color space (the color space of the scanned image) to a color space where a primary color is close to the text color. Thus, if the color of the text is black, then the first color space (e.g., the RGB space) is converted to the CMYK (cyan, magenta, yellow, black) color space.

One benefit of conversion to the CMYK space is undercolor removal is performed, in which black (K) replaces equal amounts of cyan, magenta, and yellow. This creates a darker black (when printing) than is possible by mixing the three primaries.

As another example, if the text is red, then the destination color space would be the RGB space.

Next, at step 108, the image processing program selects the text color channel. Thus, if the text is black, then the K channel in the CMYK color space is selected. The other channels (C,M,Y) are discarded. If the text is red, then the R channel in the RGB space is selected, and the G and B channels are discarded. For a text color that does not correspond exactly to a color channel, the closest color channel is used. For example, if the text is lavender, the closest color channel would be the R channel in the RGB space.

The values in the selected color channel for each pixel are next used to derive gray values in a grayscale space. For example, if a 24-bit RGB scanner is used and the image processing program later converts the 24-bit RGB image to a 32-bit CMYK image, the 8-bit K channel represents 256 gray levels for each pixel in the image. The pixels having these K values thus form a grayscale image. Alternatively, a pixel's gray value can be derived by taking the complement of the K channel, i.e., gray value is 1-K value.

Processing can also be performed by the image processing program on a cell level rather than on a pixel level, with a cell defined as a group of N×N pixels, N being greater than or equal to one. A cell can also be defined as a group of M×N pixels, M being different from N.

As another example, where the R channel is selected and the G and B channels are discarded, gray values are derived from corresponding R values of the pixels using a known algorithm, such as the NTSC video standard algorithm described in the *Postscript Language Reference Manual*, referenced above. According to the NTSC video standard, a gray value converted from the RGB space is determined as $(0.3*R+0.59*G+0.11*B)$. Since the G and B channels have been discarded by the image processing program, their values can be set to zero in the given formula.

Figure 2:
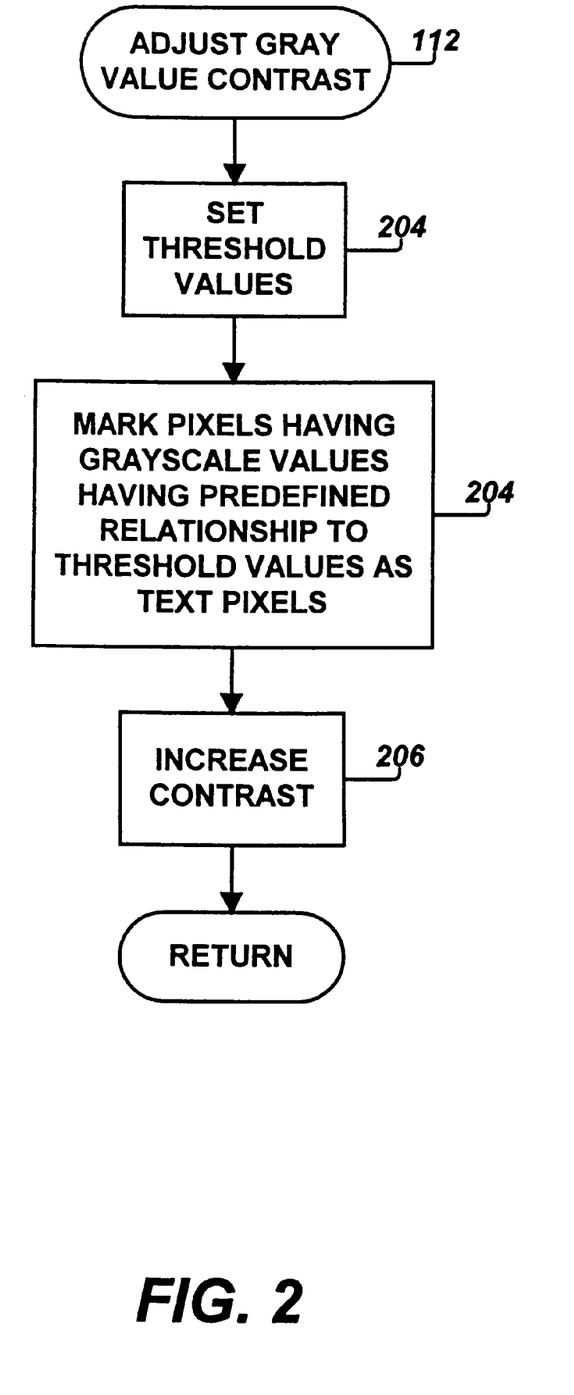
FIG. 2 is a flow diagram of the process for adjusting the image processed by the image processing program.

Using the derived gray values, the grayscale image is further enhanced by thresholding and increasing the contrast of each pixel (step 112). Referring to FIG. 2, the image processing program first sets threshold values (step 202). The threshold values can be preset or set dynamically depending upon the content of the scanned image (e.g., color of the text, pixel value of the text in the text's primary color channel).

Next, all pixels having a gray value of a predefined relationship with respect to the threshold values are marked as text pixels (step 204). The threshold values define a range—if pixel values fall within this range, they are marked as text pixels, while if pixel values fall outside this range, they are marked as non-text pixels. However, in an image containing black text, only the lower threshold value is meaningful, and the threshold may be set at 225. Pixels having gray values above 225 are marked as text pixels. Generally, in an image containing black text, text letters are represented by a high gray value (a gray value of 225 or more), and a white background is represented by a low gray value (e.g., a gray value of 25 or less). Blurs are represented by mid-point gray values (generally a gray value between 25 and 225).

If the text is associated with another color, e.g., red, then the threshold values are set at different values, and text pixels can be defined as those having gray values within the range defined by the threshold values.

Next, the contrast between pixels may be increased to create a strong differential between text pixels and non-text pixels (step 206). One way of increasing contrast is to leave unchanged the gray values of text pixels (i.e., those pixels having gray values within the specified threshold values), while changing the gray values of non-text pixels. In the example where the image includes black text and the threshold values are set between 225 and 255, the image processing program can subtract ⅓ of a pixel gray value that is below 225, but leave the gray value unchanged above 225. For example, if the pixel has a source value of 200, it would be converted to a destination value of 133, but if the pixel has a source value of 240, its destination value would remain at 240. In this manner, the distinction between text pixels and non-text pixels is exaggerated to further enhance the image.

As another example, if text pixels have gray values between 150 and 175, then contrast can be improved by setting to a low value (e.g., zero) those gray values outside the specified range. In addition, the gray values of the pixels within the range can be set to a high value (e.g., 255).

For other situations, the amount of subtraction and addition to increase contrast can be varied.

Referring again to FIG. 1, once steps 102–112 have been performed, the resolution of the image is modified if necessary at step 114. Since it is desired that the final image be printed on a printing device once extraneous non-text information has been removed from the scanned image, the relationship between the resolution of the scanning device and the final printing device is determined. If the resolutions are different, then the resolution of the image is scaled up or down to allow the image to be printed on the printing device. Scaling of resolutions can be performed by known techniques.

Figure 4A:
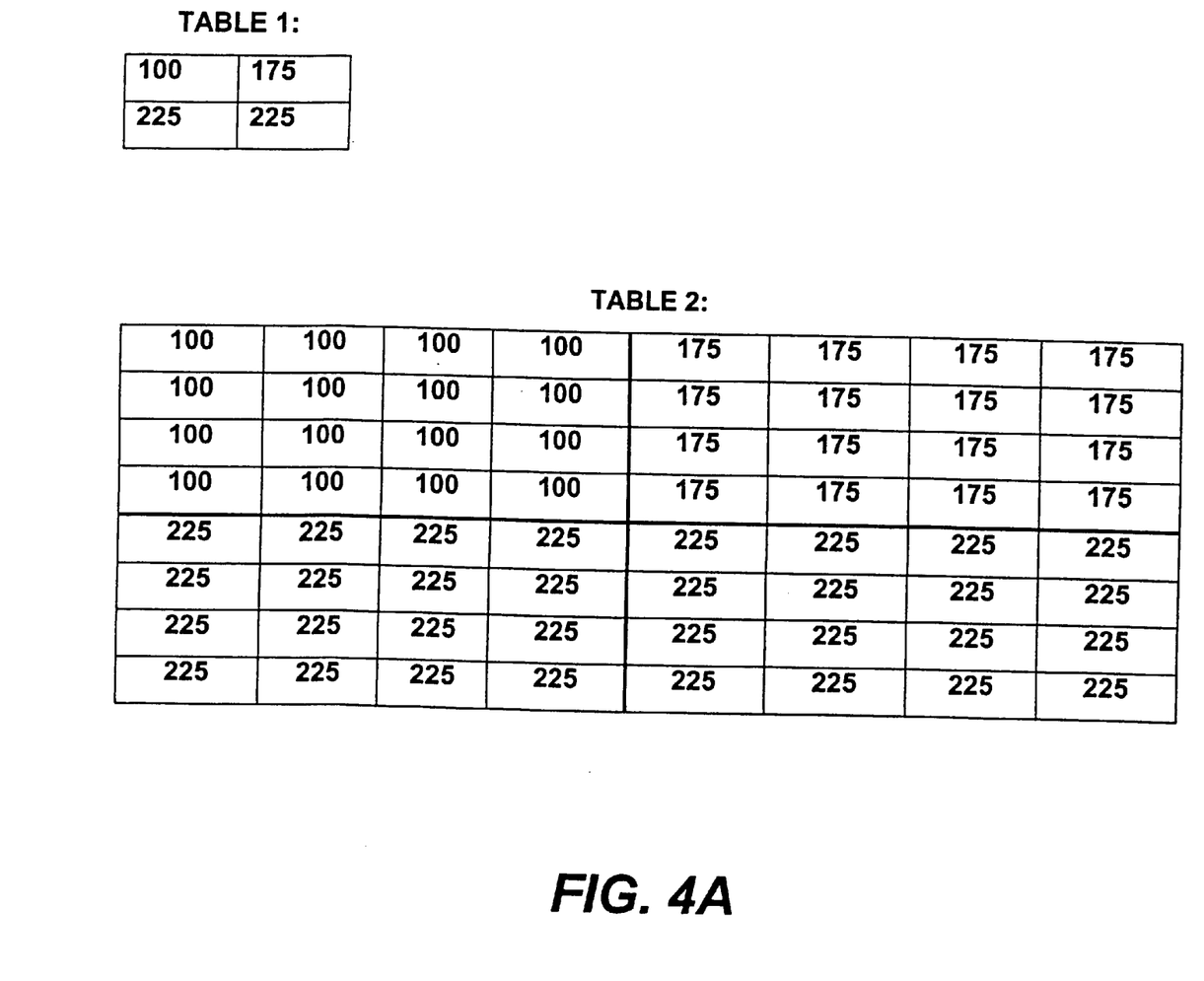
FIGS. 4A and 4B illustrate scaling of resolutions of pixels in an image.
Figure 4B:
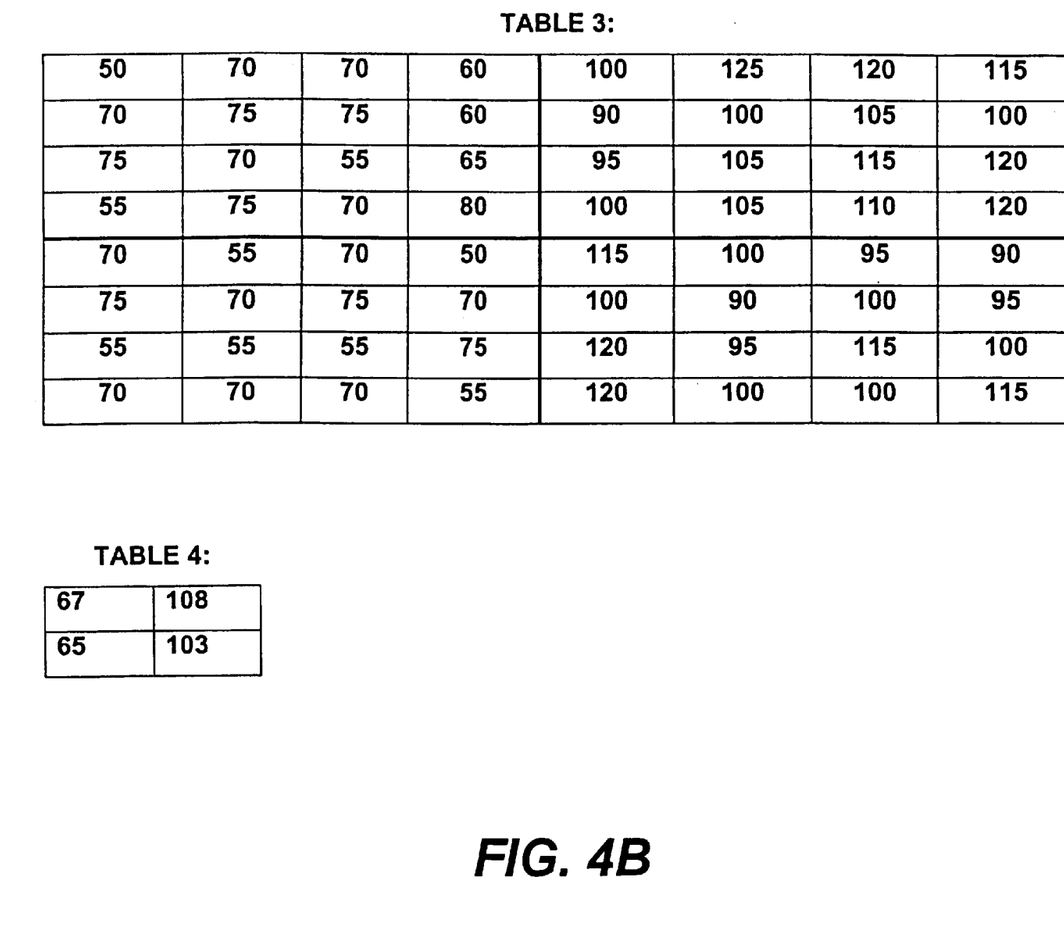

Examples of scaling up and down are shown by the tables of FIGS. 4A and 4B. Table 1 illustrates the gray values of four pixels (or dots) captured at 150 dpi. Table 2 illustrates four 4×4 cells corresponding to the 4 original pixels of the image scaled up to 600 dpi, in which the gray value of each pixel in Table 1 is repeated 16 times in each corresponding cell.

Tables 3 and 4 illustrate scaling down from 600 dpi to 150 dpi. The gray values of each 4×4 cell in the 600 dpi array are averaged and used as the value of each corresponding pixel in the ISO-dpi array of Table 4.

Also, if necessary, the grayscale image can be converted to a halftone image, also using known techniques. Halftoning increases the number of intensities available on the printing device and improves the resolution perceived by a user. Halftoning techniques are described in Foley et al., referenced above, as well as in U.S. Pat. No. 5,235,435, entitled "Method of Producing Halftone Images," and U.S. Pat. No. 5,285,291, entitled "Methods of Assigning Pixels to Cells of a Halftone Grid."

The single-color image in which the contrast between text and non-text components has been increased can then be printed on a monochrome or color printer using the retained color channel (e.g., K channel). In this manner, a high quality reproduction of text information within a page can be achieved in which extraneous non-text data are reduced, allowing better readability of the text.

Figure 3:
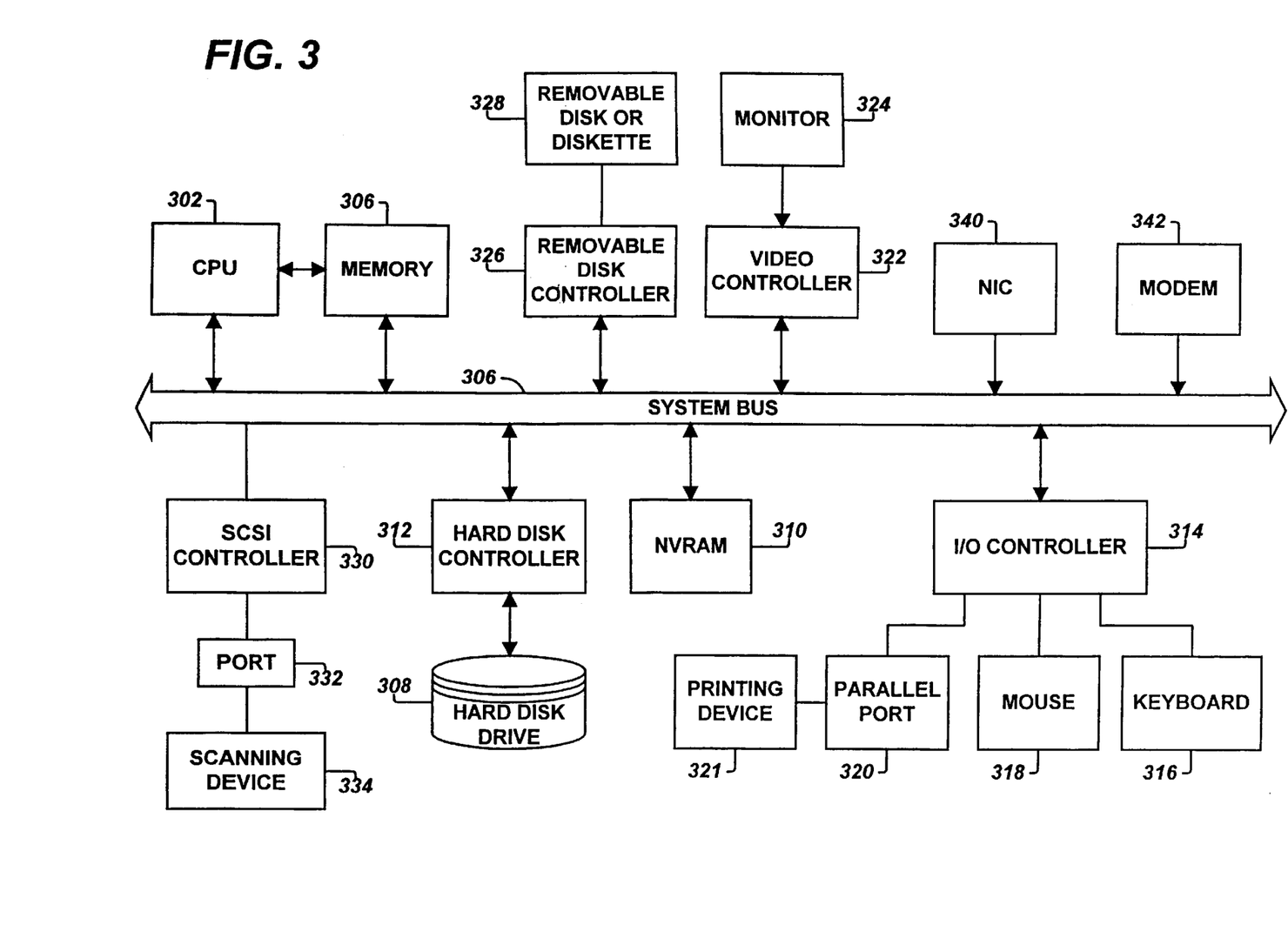
FIG. 3 is a block diagram of a computer system on which the image processing program is implemented.

Referring to FIG. 3, the image processing program described above may be implemented in digital electronic circuitry or in computer hardware, firmware, software, or in combinations of them, such as in a computer system. The computer includes a central processing unit (CPU) 302 connected to an internal system bus 304. The storage media in the computer system include a main memory 306 (which can be implemented with dynamic random access memory devices), a hard disk drive 308 for mass storage, and a nonvolatile random access memory (NVRAM) 310. The main memory 306 and NVRAM 310 are connected to the bus 304, and the hard disk drive 308 is coupled to the bus 304 through a hard disk drive controller 312.

Apparatus of the invention may be implemented in a computer program product tangibly embodied in a machine-readable storage device (such as the hard disk drive 308, main memory 306, or NVRAM 310) for execution by the CPU 302. Suitable processors include, by way of example, both general and special purpose microprocessors. Generally, a processor will receive instructions and data from the NVRAM 310 and/or the main memory 306. Storage devices suitable for tangibly embodying computer programming instructions include all forms of non-volatile memory, including by way of example semiconductor memory devices, such as EPROM, EEPROM, and flash memory devices; magnetic disks 328 connected through a controller 326 such as the internal hard disk drive 308 and removable disks and diskettes; magneto-optical disks; and CD-ROM disks. Any of the foregoing may be supplemented by, or incorporated in specially-designed ASICs (application-specific integrated circuits).

The computer system further includes an input-output (I/O) controller 314 connected to the bus 304 and which provides a keyboard interface 316 for connection to an external keyboard, a mouse interface 318 for connection to an external mouse or other pointer device, and a parallel port interface 320 for connection to a printing device 321. A scanning device 334, connected through a SCSI port 332 and a SCSI controller 330 to the system bus 304, can be used to scan paper documents to generate an image for storage in the storage media of the computer system and for processing by the image processing program.

To connect to a network, a network interface card (NIC) 340 is coupled to the bus. A modem 342 is also coupled to the bus to allow the system to communicate with another system over telephone lines.

In addition, the bus 304 is connected to a video controller 322 which couples to an external computer monitor or a display 324. Data associated with an image for display on a computer monitor 324. Data associated with an image for display on a computer monitor 324 are provided over the system bus 304 by application programs to the video controller 322 through the operating system and the appropriate device driver.

Other embodiments are within the scope of the following claims. For example, the steps described can be varied and yet still achieve desirable results. The scanning device and/or the printing device can be connected to the computer system over a network. If the scanning device has sufficient processing capability, the image processing program can run directly in the scanning device. Alternatively, the image processing program can be implemented in a digital copier that has a color scanner and a color or black and white printer.

What is claimed is:

1. Apparatus for filtering non-text information from a an image containing text, the apparatus comprising:

a storage device for storing an image; and a processor configured to:

identify a text color, being a color of text in the image;

select from a plurality of candidate multi-color-channel color spaces a text color space having a color channel that is close in color to the text color;

represent the image as a plurality of cells in the selected text color space, each cell having a value represented as one or more bits of data for each of the color channels in the text color space; and, for each cell, remove non-text color channels and retain the text color channel.

2. The apparatus of claim 1, wherein the image is originally represented in a first color space, and wherein the processor is further configured to convert the image from the first color space to the selected text color space.

3. The apparatus of claim 2, wherein the selected text color space includes a CMYK color space.

4. The apparatus of claim 3, wherein undercolor removal is performed in converting the image to the CMYK color space.

5. The apparatus of claim 1, wherein the processor is further configured to:

select as the text color channel the channel of the selected text color space that is close to the text color, the selected text color channel containing a value for each of the cells of the image, and derive a gray value corresponding to the text color channel value of the image cell for each image cell.

6. The apparatus of claim 5, wherein the processor is further configured to classify the image cells as either text or non-text cells based on their respective gray values.

7. The apparatus of claim 6, wherein the processor is further configured to adjust the gray values of the image cells to increase the contrast between the text and non-text cells.

8. The apparatus of claim 7, wherein contrast is increased by lowering the gray values of the non-text cells.

9. The apparatus of claim 7, wherein contrast is increased by increasing the gray values of the text cells.

10. The apparatus of claim 7, wherein the processor is further configured to provide the image defined by the adjusted gray values to a monochrome printer.

11. The apparatus of claim 7, wherein the processor is further configured to provide the image defined by the adjusted gray values to a color printer.

12. The apparatus of claim 1, further comprising:

a scanning device to capture the image.

13. The apparatus of claim 12, wherein the scanning device captures the image in a first color space, and wherein the processor is further configured to convert the image from the first color space to the text color space.

14. The apparatus of claim 1, wherein each cell is a single pixel.

15. The apparatus of claim 14, wherein identifying a text color comprises applying a foreground-background pixel identification method to the image.

16. The apparatus of claim 1, wherein each cell is a square or rectangular group of pixels.

17. A computer-implemented method of filtering non-text from an image containing text, comprising:

identifying the text color, the text color being a color of text in the image;

selecting from a plurality of candidate multi-color-channel color spaces a text color space having a color channel that is close in color to the text color, the close color channel being referred to as the text color channel;

representing the image as a plurality of cells in the selected text color space, each cell having a value represented as one or more bits of data for each of the color channels in the text color space;

deriving gray values corresponding to text color channel values of the cells in the image; and classifying the image cells as either text or non-text cells based on their gray values.

18. The method of claim 17, wherein the image is originally represented in a first color space, the method further comprising:

converting the image from the first color space to the text color space.

19. The method of claim 17, further comprising discarding all color channels of the second color space but the text color channel.

20. The method of claim 18, wherein the text color space includes a CMYK color space.

21. The method of claim 20, wherein the K color channel of the CMYK color space is the text color channel and is derived using undercolor removal.

22. The method of claim 21, wherein the gray values are derived using the K color channel values.

23. The method of claim 17, further comprising:

receiving the image from a scanning device.

24. The method of claim 17, further comprising:

adjusting the gray values of the image cells to increase the contrast between the text and non-text cells.

25. The method of claim 17, wherein each color channel value has multiple bits per image cell.

26. The method of claim 17, further comprising:

discarding all color channel values but the text color channel values.

27. A computer program product, tangibly stored on a computer-readable medium, for filtering non-text from an image containing text, the program comprising instructions operable to cause a programmable processor to:

identify the text color, the text color being a color of text in the image;

select from a plurality of candidate multi-color-channel color spaces a text color space having a color channel that is close in color to the text color, the close color channel being referred to as the text color channel;

convert the image to the text color space as a plurality of cells, each cell having a value represented as one or more bits of data for each of the color channels in the text color space;

derive gray values based on text color channel values of the image; and classify the image cells as either text or non-text cells based on their gray values.

28. The product of claim 27, wherein the second color channel values are discarded.

29. The product of claim 27, wherein the text color space includes a CMYK color space.

30. The product of claim 27, wherein the image cells having gray values of a predefined relationship with respect to predetermined threshold values are classified as text.

31. The product of claim 27, further comprising instructions to:

adjust the gray values of the image cells to increase the contrast between the text and non-text cells.

* * * * *

UNITED STATES PATENT AND TRADEMARK OFFICE
CERTIFICATE OF CORRECTION

PATENT NO. : 6,125,200
DATED : September 26, 2000
INVENTOR(S) : John E. Warnock

It is certified that error appears in the above-identified patent and that said Letters Patent is hereby corrected as shown below:

<u>Column 8,</u>
Line 28, insert -- cells -- after "classified as text".

Signed and Sealed this

Thirty-first Day of December, 2002

JAMES E. ROGAN
*Director of the United States Patent and Trademark Office*